INVENTOR:
Ernest Wildhaber

United States Patent Office 2,891,392
Patented June 23, 1959

2,891,392

UNIVERSAL JOINT

Ernest Wildhaber, Brighton, N.Y.

Application January 14, 1957, Serial No. 633,991

4 Claims. (Cl. 64—8)

The present invention relates to universal joints for transmitting torque between two members whose axes intersect at an angle which may vary in operation; and particularly to the type of universal joints in which a pair of coaxial rollers mounted on one member engage internal ways of the other of said two members, and where the ways extend parallel to the axis of said other member. Such joints permit relative displacement of said members in the direction of the last-named axis. That is they operate properly in different axial positions, and can be used in places where such axial displacement occurs in operation.

One object of the present invention is to devise a universal joint that is capable of transmitting more torque than comparable known joints of the same outside diameter. This is a feature more important than a mere gain in price, for in many applications the space provided is very limited.

A further object is to achieve a smaller and lighter joint to carry a given torque, and to reduce the cost of the joint.

A further aim is to simplify the design of the joint, especially where spherical rollers are used.

Other objects will appear in the course of the specification and in the recital of the appended claims.

The gain in torque capacity achieved with the present invention is attained principally with the size-proportion and disposition of the rollers.

Figure 1:
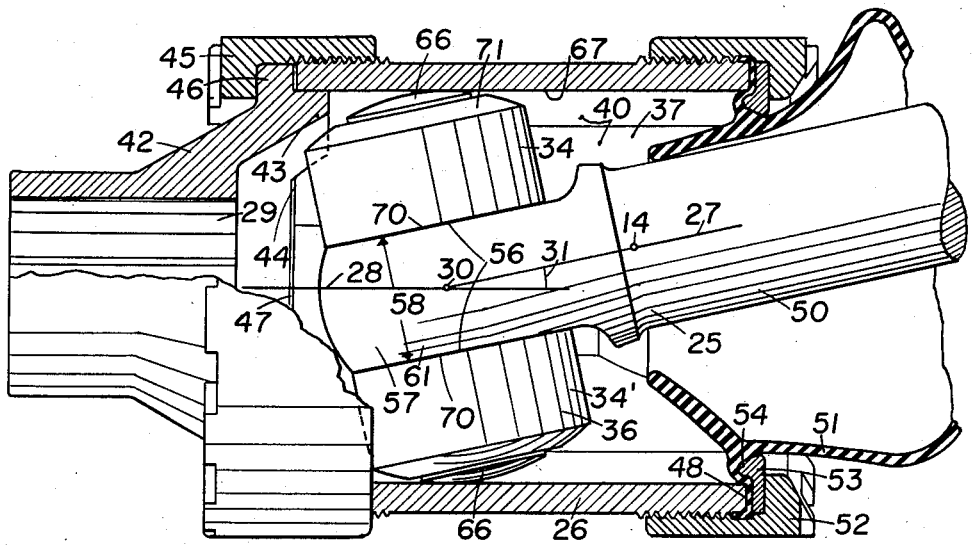
Fig. 1 is a diagram explanatory of the principles underlying the present invention. It can be considered a diagrammatic section laid through the roller axis at right angles to the axis of the roller carrying member.

Diagram Fig. 1 serves to compare different roller proportions in all its aspects, different roller diameters, leverage of the roller load, and face width or profile length of the roller. The compared rollers occupy the same radial space. Their profiles are contained within an outer circle 15 and lie outside of an inner circle 16. Circle 15 is the circle that contains the bottom profile of the way engaged by the roller, while circle 16 contains the profile of the cylindrical bore of the member containing the ways. The bore determines the amount of clearance of the shaft 50 at shaft angularity. Accordingly rollers are compared that have the same degree of clearance and that result in joints of equal diameter.

The roller profiles shown refer to cylindrical rollers. Their profiles 17', 17" are straight and extend parallel to the roller axis 18. However the conclusions apply also to the curved profiles of ball-type or spherical rollers.

Profile 17' describes a conventional cylindrical roller. It extends between end points 20', 21' that lie on the circles 15 and 16 respectively. The normal 22'—23' at mean profile point 22' intersects the roller axis 18 at right angles, at point 23'. Distance 22'—23' represents the radius of the considered roller.

The load applied to the roller by its contact with a way is perpendicular to the roller profile. When uniform load is applied to the whole length 20'—21' the resultant load passes through mean point 22' and extends along normal 22'—23'. Its leverage with respect to the axis O of the roller carrying member is its distance O—23' from said axis.

Let it be assumed that the roller is loaded to capacity. The usual way to compute the load capacity of cylindrical surfaces contacting plane sides is with the formulas of the well known Hertz analysis of this kind of contact. This analysis states that the load capacity of rollers of different diameters and otherwise equal specifications is proportional to the radii of the rollers. This result is also approximately borne out in practice.

Accordingly the load capacity of the compared rollers, per unit of length, is considered to be proportional to their radii. Roller radius 22'—23' is therefore a measure of this load capacity of the first considered roller.

The torque applied to the roller carrier is the product of the load, represented by distance 22'—23', and the leverage O—23'. This product is equal to the area of the rectangle O—24'—22'—23'. The torque capacity per unit of length of the roller should be multiplied with the length 20'—21' of the roller to attain the total torque capacity of the roller. This total capacity is therefore represented by the product of the rectangle O—24'—22'—23' and length 20'—21'.

Profile 17" describes a roller proportioned according to the present invention. It extends between end points 20", 21", that lie on circles 15 and 16 respectively. 22"—23" is the normal at mean profile point 22"; and distance 22"—23" is also the roller radius. The construction is the same as already described. The total torque capacity is represented by the product of the cross-hatched rectangle O—24"—22"—23" and profile length 20"—21". In this way the torque capacity of this roller is computed as 73% larger than the one of the roller with profile 20'—21'.

It should be noted that the leverage (O—23") decreases with increasing roller diameter, so that at a given torque the roller load is increased. This has hitherto been a deterrent to the use of rollers with increased diameter proportions. But it is seen now that the load capacity of the roller increases at a faster rate. And moreover the length of the roller profile increases also.

Accordingly a simple and efficient way of increasing the torque capacity of a universal joint of given outside diameter is to use the roller diameter proportions of the present invention.

It should also be noted that the larger rollers turn through smaller angles in operation. Because of this it is also possible to mount the rollers on plain bearings in cases where it is otherwise impractical.

Figure 2:
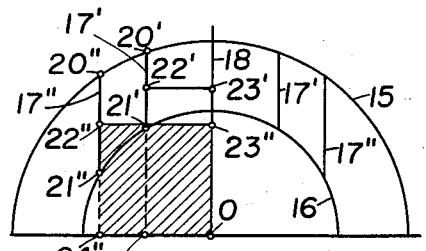
Fig. 2 is an axial section of one form of universal joint constructed according to the present invention and shown at the maximum design angularity, the roller carrying member being shown in a side view.
Figure 3:
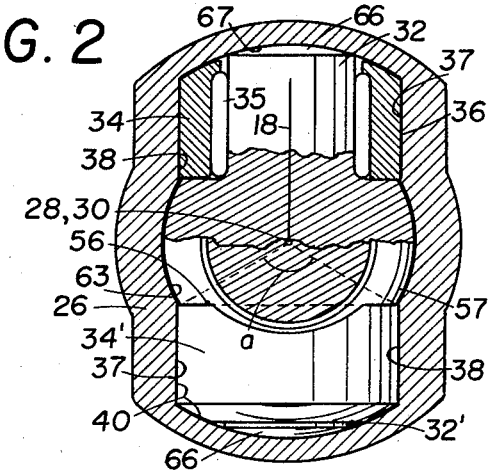
Fig. 3 is a cross-section corresponding to Fig. 1, with the joint shown in alignment. The sectional view is made up of two plane sections perpendicular to the aligned axes of the joint, one section being laid through the roller axis, and the other section being laid through a point 14 (Fig. 2) to the right of the roller axis, looking towards the rollers.
Figure 4:
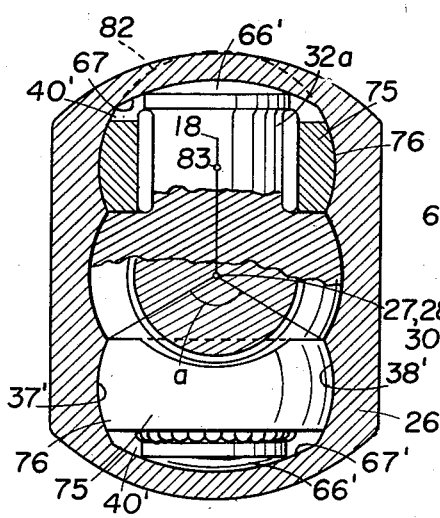
Fig. 4 is a view taken along the roller axis of the roller carrying member, that corresponds to Figures 2 and 3.

In Figures 2 to 4, numerals 25, 26 denote the two members connected by the universal joint, to transmit torque between them. Their axes 27, 28 intersect at 30, at an angle 31 (Fig. 2) which may vary in operation. Member 25 contains coaxial cylindrical portions or journals 32, 32' that project radially of its axis 27, and that have a common axis 18. These journals may be formed integral with member 25. Or, if desired, they may be parts of a pin or rod rigidly secured to member 25. At any rate they are rigid with member 25 and move therewith.

A pair of rollers 34, 34', embodying the profile 20"—21" of Fig. 1, are rotatably mounted on journals 32, 32', as by needle bearings 35. However, plain bearings may also be used. The rollers 34, 34' contain working surfaces 36 on their outside. These are cylindrical surfaces, which may be eased off at their ends if desired. They are adapted to engage the plane sides 37, 38 of internal ways 40 provided on the other member 26 of the universal joint. Member 26 encloses the rollers 34, 34'. Its ways 40 extend parallel to its axis 28; the plane sides 37, 38 are parallel to and offset from axis 28. Opposite sides 37, 38 are engaged respectively by each roller 34, 34' to transmit torque in opposite directions.

As shown in Fig. 3, the profiles of the opposite sides 37, 38 of each way 40 together occupy an angle $a$ larger than a right angle about axis 28.

Member 26 may be rigidly connected to a torque transmitting flange member 42, as by means of projections 43 that fit the ends 44 of the ways 40, and by means of a ring-shaped nut 45 threading onto member 26 and pressing flange 46 towards the face of member 26. A gasket 47 is interposed between flange 46 and member 26, to prevent leakage of lubricant. The flange member 42 may be connected to a shaft (not shown) matching its splines 29.

Member 26 is flared at the opposite end 48, to better clear the shaft portion 50 of the roller carrying member 25. A flexible boot 51 of known character is attached to end 48, as by means of a ring-shaped nut 52 threading onto member 26. The latter contains flange portions to provide circular ends. Nut 52 exerts pressure on a ring 53 which clamps the adjacent boot end to the end 48 of member 26. Ring 53 contains projections 54 opposite the guide-ways 40, reaching into the guide-ways to be secured against turning. The boot end is thus clamped between two parts which do not turn relatively to each other. The opposite end of the boot (not shown) is tightly secured to a portion rigid with shaft portion 50.

When the ways 40 of member 26 extend clear through the length of the member without obstruction, as illustrated, its ways may be finish cut by broaching, and a smooth finish may be applied by cold drawing over parts representing a pair of rollers. Also the member lends itself well to polishing, to honing, and to grinding if desired.

Member 26 may be made of drawn tubular stock sawed into pieces of the required length. The flare at end 48 and the circular ends at both extremities may be applied by coining or forging or pressing.

The adjacent ends 56 of the rollers 34, 34' are separated by the central portion 57 of the roller carrying member 25. It should be noted that the outside diameter of said rollers at their adjacent ends 56 is larger than the thickness 58 of the central portion 57, so that the proportion of said diameter to said thickness is larger than unity.

The central portion 57 merges into an adjacent cylindrical shaft portion 50 of larger outside diameter than the thickness 58 of portion 57. Thickness 58 is smaller than said shaft diameter.

But what the central portion 57 lacks in thickness it makes up in width, which is larger than said shaft diameter.

The central portion 57 of member 25 has an outside surface that is spherical adjacent end 60. The spherical portion 61 is joined by a conical surface 62 tangent thereto, and into which said spherical surface can be inscribed. The said conical surface leads towards the cylindrical shaft portion 50, and preferably has a cone angle or taper equal to the largest shaft angularity for which the joint is designed. It is nearly the surface that is enveloped on member 25 by the inside cylindrical surface 63 (Fig. 3) of member 26 at the largest shaft angularity of the joint, at the extreme axial position shown, and is slightly smaller than said enveloped surface.

Centering

As well known, centering is required in the direction of the roller axis 18. This is effected in a novel manner according to the invention. It is accomplished with the curved outer end surfaces 66 of the journal portions 32, 32'. Surfaces 66 engage the bottom surfaces 67 of the respective ways 40. These bottom surfaces are different portions of a single cylindrical surface coaxial with axis 28 of the internal member 26. The end surfaces 66 of portions 32, 32' are different portions of a single spherical surface that is tangent to and inscribed to said cylindrical surface 67. The center 30 of said spherical surface therefore is maintained on the axis 28 of the internal member 26 through this direct contact with said cylindrical surface.

Such direct contact between the members 25, 26 is preferable to a contact through the rollers, where the shoulders 70 of member 25 contact the inside ends 56 of the rollers 34, 34', and the spherical outside ends 71 of the rollers contact the cylindrical bottom surfaces 67 of the ways. In this latter case there are more tolerances to be added. To the tolerance of the distance of opposite shoulders 70 is added the tolerance of the axial thickness of the rollers. With the direct contact provided in accordance with the invention the rollers are loose axially, and their thickness does not enter into the picture.

Also when centering through the rollers the rollers should be somewhat loose axially, to prevent transmission of torque through the shoulders 70. Here such looseness further jeopardizes accurate centering, whereas it is meaningless in the design illustrated.

Modification

Figure 5:
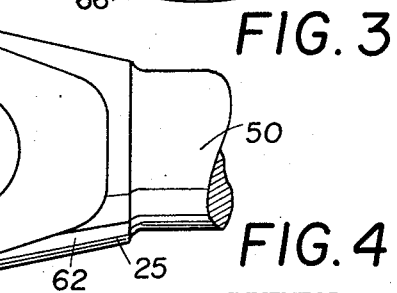
Fig. 5 is a cross-sectional view similar to Fig. 3, showing a modification.

The modification shown in Fig. 5 uses ball-type rollers 75, that have each a spherical working surface 76. The same proportions are used as with the described cylindrical rollers. In either case the working profiles (Figs. 3 and 5) of opposite sides 37, 38 or 37', 38' of each way occupy an angle $a$ larger than a right angle about the axis 28 of the internal member with ways.

Each way 40' of member 26' (Fig. 5) has opposite sides 37', 38' that are parts of a single cylindrical surface 82, which extends parallel to axis 28 of member 26'. The side profiles are circular arcs centered at the sphere center 83. They are joined by the circular arcuate profile 67' of the cylindrical bottom surface 67 of the ways. This is the same bottom surface as described with Figures 2 and 3. The roller carrying member 26' is practically identical with the described member 26.

In operation the sphere center 83 of each roller 75 remains on the axis of the cylindrical surface 82 of its way, and at shaft angularity moves axially somewhat along its journal 32a, as is known. Centering through the rollers is therefore not feasible. Here centering with the ends of the journals, according to the present invention, assumes further significance through its simplicity and directness. The outer end surfaces 66' of the journal portions 32a are again different portions of a single spherical surface that is centered at 30 on the axis 28 of member 26'. Surfaces 66' are identical with the described surfaces 66. The said spherical surface can be considered inscribed to the cylindrical surface 67 and contacts said cylindrical surface along a great circle. The plane of this great circle passes through sphere center 30 and is perpendicular to the axis 28 of cylindrical surface 67. It passes also through the end surfaces 66'. The resultant contact centers the joint.

To achieve this simple centering it is necessary to depart from the conventional shape of the ways for ball-type rollers, where the bottom profile of a way is part of the same circle as the profiles of sides 37', 38'. It is necessary to use the arcuate bottom 67 described, whose profile is centered on the axis 28 rather than at 83. It is further necessary to provide journals of a diameter large enough to stay in contact with the bottom 67 at all shaft angularities for which the joint is designed. The present invention takes advantage of the relatively large diameters of the journals, which come natural with joints of increased torque capacity.

The invention is also applicable to double joints that achieve constant velocity with two spaced universal joints and a constraint to keep the axes of the two joint members at opposite ends intersecting midway between said spaced joints. It is not applicable, however, to constant velocity joints having a plurality of roller pairs whose axes intersect. These require at least four ways, so that it is impossible for a roller to occupy an angle larger than a right angle. The angle will have to be smaller than a right angle or a right angle at the most.

While the invention has been described with two different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features herein-before set forth and as fall within the scope of the invention or the limits of the appended claims.

I claim:
1. A universal joint for transmitting torque between two members whose axes intersect at an angle which may vary in operation, comprising the said two members, a pair of rollers rotatably mounted on one of said members to turn on a common axis projecting radially of the axis of said one member, the other of said two members enclosing said rollers and containing internal ways parallel to its axis, for engagement with said rollers, each of said ways having a pair of opposite side surfaces joined by a cylindrical bottom surface coaxial with said other member, opposite working profiles of each way together occupying an angle larger than a right angle about the last-named axis, said profiles lying in a plane perpendicular to the last-named axis, said one member having a cylindrical shaft portion on one side that merges into a central portion carrying said rollers, said central portion having a thickness between adjacent rollers smaller than the outside diameter of said shaft portion and having an outside diameter larger than the outside diameter of said shaft portion, and a pair of spherical surface portions provided on parts carried by said one member, for centering said one member through engagement with said cylindrical bottom surfaces.

2. A universal joint for transmitting torque between two members whose axes intersect at an angle which may vary in operation, comprising the said two members, a pair of rollers rotatably mounted on coaxial journals projecting radially from a central portion of one of said members, the other of said two members enclosing said rollers and containing internal ways parallel to its axis, for engagement with said rollers, opposite working profiles of each way together occupying an angle larger than a right angle about the last-named axis, the outside diameters of said rollers at their adjacent ends being larger than the thickness of said central portion that separates said ends, said central portion having a spherical outside surface that merges into a cylindrical shaft portion of larger outside diameter than the thickness of said central portion, the width of said central portion being larger than the last-named outside diameter, said spherical portion being joined by and tangent to a conical surface into which said spherical surface can be inscribed, said conical surface leading towards said cylindrical shaft portion, the cone angle of said conical surface being approximately equal to the largest shaft angularity for which the joint is designed.

3. A universal joint comprising two members whose axes intersect at an angle which may vary in operation, a pair of rollers rotatably mounted on coaxial journals projecting radially from a central portion of one of said members, said rollers having spherical outside surfaces, the other of said members enclosing said rollers and containing internal ways parallel to its axis, opposite side surfaces of each way being portions of a single cylindrical surface engaging the spherical outside surface of a roller, the bottom surfaces of said ways being different portions of a single cylindrical surface coaxial with the member containing the ways, and the outer end surfaces of said journals being convexly curved and being adapted to engage the bottom surfaces of said ways for centering, said outer end surfaces being different portions of a single spherical surface inscribed to the last-named cylindrical surface and centered on the axis of the roller carrying member.

4. A universal joint according to claim 1, wherein the ways have parallel plane sides and wherein the rollers have cylindrical outside working surfaces at least approximately.

References Cited in the file of this patent

UNITED STATES PATENTS

| | | |
|---|---|---|
| 1,031,222 | Winton | July 2, 1912 |
| 2,186,846 | Trbojevich | Jan. 9, 1940 |
| 2,722,115 | Dunn | Nov. 1, 1955 |
| 2,755,641 | Dunn | July 24, 1956 |